United States Patent [19]
Auvity

[11] Patent Number: 5,873,777
[45] Date of Patent: Feb. 23, 1999

[54] HEATING, VENTILATING AND/OR AIR CONDITIONING, AND THE LIKE INSTALLATION WITH TEMPERATURE REGULATION, ESPECIALLY FOR MOTOR VEHICLES

[75] Inventor: Michel Auvity, Velizy, France

[73] Assignee: Valeo Climatiszation, La Verriere, France

[21] Appl. No.: 826,488

[22] Filed: Mar. 27, 1997

[30] Foreign Application Priority Data

Mar. 28, 1996 [FR] France ................................. 96.03898

[51] Int. Cl.$^6$ ..................................................... B60H 1/32
[52] U.S. Cl. ............................................. 454/75; 454/160
[58] Field of Search ............................. 454/75, 121, 156, 454/160, 161; 236/49.3

[56] References Cited

U.S. PATENT DOCUMENTS

| | | | |
|---|---|---|---|
| 5,331,823 | 7/1994 | Matsuoka | 62/173 |
| 5,404,729 | 4/1995 | Matsuoka et al. | 62/179 |
| 5,511,724 | 4/1996 | Frieberger et al. | 236/49.3 |
| 5,653,386 | 8/1997 | Hennessee et al. | 454/75 X |

FOREIGN PATENT DOCUMENTS

| | | |
|---|---|---|
| 0 060 510 | 9/1982 | European Pat. Off. . |
| 0 419 707 | 4/1991 | European Pat. Off. . |
| 0 546 429 | 6/1993 | European Pat. Off. . |

OTHER PUBLICATIONS

Patent Abstracts of Japan, vol. 94, No. 011 and JP-A-06 312619 (Nippondenso Co Ltd). 8 Nov. 1994.

*Primary Examiner*—Harold Joyce
*Attorney, Agent, or Firm*—Morgan & Finnegan, LLP

[57] ABSTRACT

A heating and ventilating installation for a motor vehicle includes a regulating valve for adjusting the distribution of fresh air, received from a fresh air delivery chamber, between a first duct and a second duct. The first duct contains a heating radiator, and the first and second ducts exhaust into an air mixing zone, which communicates with a ventilating air vent and a foot warming vent in the cabin of the vehicle. A temperature sensor is located immediately downstream of the heating radiator, and transmits signals, representing the prevailing value of the temperature of heated air in the first duct, to a processing module. The processing module controls at least the positional setting of the regulating valve, in response to a required value of cabin temperature set by the user in a control module, together with the temperature measured by the sensor, and in accordance with a predetermined law relating to a difference in temperature between the two air streams distributed to the ventilating and foot warming vents respectively.

8 Claims, 2 Drawing Sheets

HEATING, VENTILATING AND/OR AIR CONDITIONING, AND THE LIKE INSTALLATION WITH TEMPERATURE REGULATION, ESPECIALLY FOR MOTOR VEHICLES

FIELD OF THE INVENTION

This invention relates to installations, especially for use in motor vehicles, for providing heating, ventilating and/or air conditioning.

More particularly, the invention is concerned with an installation for heating, ventilating and/or air conditioning, especially for a motor vehicle, of the type comprising: a fresh air delivery chamber leading into a first duct and a second duct in parallel with each other. The first duct contains a radiator for heating at least some of the fresh air. The second duct is arranged for at least some of the fresh air to pass through it. A regulating valve adjusts the distribution of the fresh air between the first duct and the second duct. The first and second ducts exhaust at least partially into an air mixing zone which communicates with air outlets in the cabin of the vehicle. The air outlets have ventilating air vent means and foot warming air vent means; and processing means for actuating the installation in response to a cabin temperature which is set by a user of the vehicle, thereby providing a temperature difference between the air which is passed to the ventilating air vent means and that which is passed to the foot warming air vent means.

BACKGROUND OF THE INVENTION

In this type of installation, when the regulating valve is in a position in which it is at least partly open, the fresh air which is derived from the fresh air delivery chamber is distributed between the first and second ducts. Because of the respective positionings, in relation to the mixing zone, of secondary ducts which carry the air from the air treatment unit itself (i.e. the unit that includes the fresh air delivery chamber, the first and second ducts and the mixing zone, and which normally also includes a fan), to the ventilating and foot warming vents in the cabin, the temperature of the treated air delivered through the ventilating air vents is not the same as the temperature of that which is delivered through the foot warming vents.

This type of configuration is commonly known as a bi-level arrangement. In a bi-level arrangement, the air delivered at the level of the feet of the occupants of the vehicle is generally hotter than that which is supplied through the air ventilating vents. When a user desires to alter the cabin temperature, he sets a new temperature which is taken into account by the processing means. The latter then, in particular, acts to adjust the positional setting of the regulating valve, so as to modify the distribution of the fresh air between the above mentioned first and second ducts.

This adjustment of the positional setting of the regulating valve generally involves a substantial change in the temperature difference between the treated air delivered to the foot warming outlet vents and the treated air delivered to the ventilating vents. This can result in a great deal of discomfort and inconvenience for the occupants of the vehicle, and in particular the driver.

DISCUSSION OF THE INVENTION

A main object of the invention is to overcome the above mentioned drawback.

According to the invention, an installation is provided for heating, ventilating and/or air conditioning, especially for a motor vehicle. The type has: a fresh air delivery chamber leading into a first duct and a second duct in parallel with each other. The first duct contains a radiator for heating at least some of the fresh air. The second duct is arranged for at least some of the fresh air to pass through it. A regulating valve adjusts the distribution of the fresh air between the first duct and the second duct, with the first and second. ducts exhausting at least partially into an air mixing zone. The air mixing zone; communicates with air outlets in the cabin of the vehicle, the air outlets comprising ventilating air vent means and foot warming air vent means; and processing means for actuating the installation in response to a cabin temperature which is set by a user of the vehicle. This provides a temperature difference between the air; which is passed to the ventilating air vent means and that which is passed to the foot warming air vent means. The installation further includes, downstream of the radiator, a temperature sensor for transmitting to the processing means measurements of the temperature in the heated air in the first duct. The processing means are so arranged as to govern at least the setting of the regulating valve, firstly in response to the cabin temperature set by the user and the measured temperature, and secondly in accordance with a predetermined law governing the temperature difference.

In an installation according to the invention, whatever value of required cabin temperature may be set by the user, the processing means are capable of adjusting at least the setting of the regulating valve so that the temperature difference between the ventilating and foot warming outlet vents will always be in accordance with the predetermined law, or algorithm. This predetermined law is preferably one whereby the above mentioned temperature difference is constant or substantially constant, regardless of the value of temperature set by the user.

In a preferred embodiment of the invention, the processing means include a memory in which a correspondence table is stored. The correspondence table is a table of correspondence between a plurality of first sets of parameters, comprising, respectively, different combinations of at least one temperature inside the cabin and a temperature of heated air in the first duct, and a plurality of second sets of parameters. Each of these define at least one adjustment of the positional setting of the regulating valve among all possible positional settings thereof. There is one second set of parameters associated with each first set of parameters.

Thus, when the processing means receive a value of temperature set by the user, together with a measured value of the prevailing temperature in the heated air in the first duct, the processing means compares the pair of values represented by these two temperatures with the plural pairs of air temperature values which are held in the memory. Among these plural pairs of values will be a pair of values identical to the pair of values input to the processing module, i.e. the set value received from the user via the control module and the actual value measured by the temperature sensor. The pair of values memorized in the table in the memory is associated with a singleton which defines the appropriate adjustment for the regulating valve.

The processing means can then instantly perform the resulting required resetting of the regulating valve.

In another embodiment, the processing module is further arranged to control the flow rates of treated air for delivery to the ventilating air vent means and foot warming air vent means as a function of air flow rate parameters set by the user, while maintaining the temperature difference substantially constant regardless of the cabin temperature set by the user. The control of treated airflow is effected by control of a fan which is part of the installation, in conjunction with control of at least the regulating valve.

In this last mentioned version, it is particularly preferred that, firstly, the first sets of parameters comprise different combinations of the cabin temperature, the heated air temperature in the first duct, and the airflow parameters the second sets comprise different combinations of parameters defining adjustments of the fan and the positional setting of the regulating valve.

Thus, in this embodiment of the installation, it is possible to maintain the temperature difference in accordance with the predetermined law, while at the same time modifying the temperature in the cabin and the flow rate of treated air delivered to the ventilating and foot warming vents respectively.

The first sets of parameters are accordingly, from then on, in the form of quadruplets which comprise, firstly, a temperature in the cabin, secondly a heated air temperature in the first duct, thirdly a first parameter of airflow rate related to the ventilating outlet vents, and fourthly a second airflow rate parameter in respect of the foot warming outlet vents. In addition, the second sets of parameters are from then on pairs of values defining, firstly, adjustments of the fan, and secondly, positional settings for the regulating valve.

In accordance with a further preferred feature of the invention, the processing means are arranged to sample the measured air temperature periodically, and to modify the adjustments of the installation after each new sampling of the measured temperature. The frequency with which the temperature of the heated air is sampled can be chosen to suit the options proposed by the manufacturer.

Preferably, the temperature sensor is fixed to the wall of the downstream part of the first duct, and is substantially centred with respect to an outlet face of the radiator, the radiator being mounted upstream of the downstream part of the first duct.

Further features and advantages of the invention will appear more clearly on a reading of the following detailed description of an installation, in a motor vehicle, for heating, ventilating and/or air conditioning, illustrating preferred embodiments of the features of the invention, the description being given by way of non-limiting example only and with reference to the accompanying drawings.

DESCRIPTION OF PREFERRED EMBODIMENTS OF THE INVENTION

Figure 1:
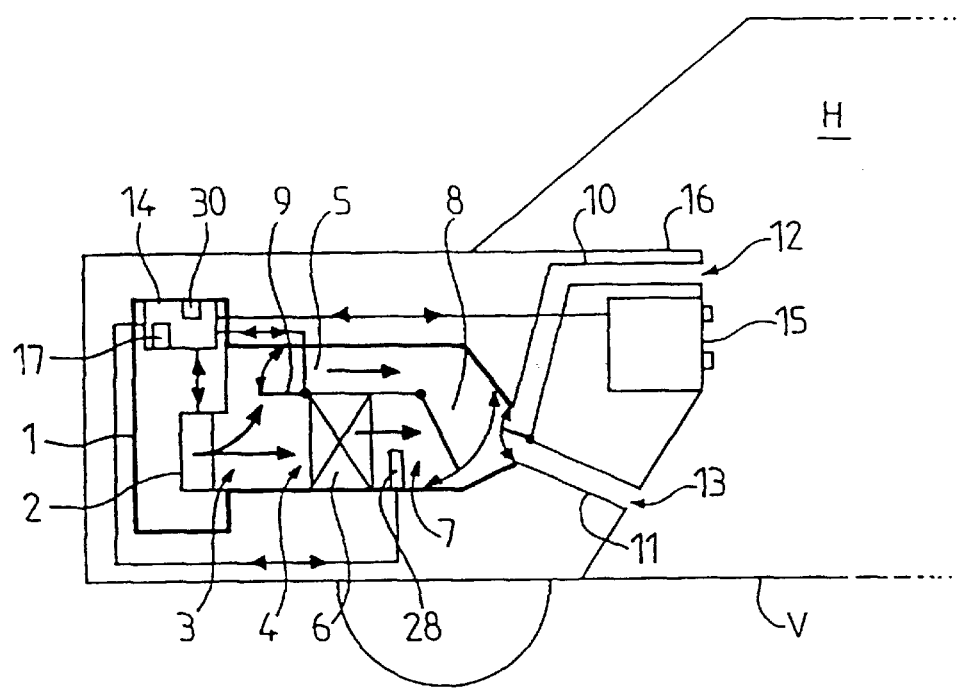
FIG. 1 shows, in diagrammatic side elevation, the front part of a motor vehicle, showing the installation in block circuit diagram form.

Referring first to FIG. 1, this shows a vehicle V, having an engine compartment in which is mounted an installation 1 for, for example, heating and ventilating the cabin H of the vehicle. This installation, which is shown in thick lines in FIG. 1, consists mainly of a motorized fan unit 2 which receives fresh air from outside the vehicle, or recycled air from inside the cabin H, or both. The fan unit 2 delivers fresh air to the cabin H through a fresh air delivery chamber 3 which leads into a first, or heating, duct 4 and a second, or fresh air, duct 5. These ducts 4 and 5 are connected in parallel with each other.

The first duct 4 contains a radiator 6, and has a downstream part 7 which is open into an air mixing zone or communication duct 8. The second duct 5 is arranged to pass at least some of the fresh air issuing from the fresh air delivery chamber 3 to the region of the air mixing zone 8, so that both of the ducts 4 and 5 in fact exhaust into the mixing zone 8.

The installation also includes a regulating valve 9, in the form of a controllable flap valve, for adjusting the distribution of the fresh air from the delivery chamber 3 into the first or heating duct 4 and the second or fresh air duct 5.

The air mixing zone 8 is connected to a first secondary duct 10 and a second secondary duct 11, which exhaust at their downstream ends in a ventilating air vent 12 and a foot warming air vent 13 respectively. There may of course be more than one of each vent 12 or 13. These vents 12 and 13 are located in selected places within the cabin H, so that air treated by the installation is passed into the cabin from the mixing zone 8, via the ducts 10 and/or 11, into the cabin selectively, via the vents 12 and/or 13.

The installation 1 also includes a processing module 14, which is adapted to convert into appropriate control signals orders addressed to it by a control module 15 mounted in the fascia 16 of the vehicle. These orders are emitted by the control module 15 when a user, sitting in the cabin H of the vehicle, sets on the module 15 a parameter related to conditions required in the cabin, as for example the temperature in the cabin, the zone of the cabin into which treated air is to be distributed, or the flow rate of this treated air into the cabin.

Once these parameters relating to cabin air conditions are set by the user, the control module 15 then passes an order to the processing module 14 so that predetermined adjustments of the installation 1 can be carried out in obedience to the parameters which the user has set. To this end, the processing module 14 includes a memory 17 in which a correspondence table is stored. This table comprises, as inputs, sets of parameters relating to air conditions in the cabin, while its output signals represent sets of adjustments for the various adjustable parts of the installation. There is one of these sets of adjustments corresponding to each set of cabin air condition parameters. All of these sets of parameters are different from each other, and all the sets of adjustments are different from each other.

In this way, all possible combinations of adjustments offered by the installation 1 are memorised in the memory 17. In consequence, on receipt of an order (or command signal) from the control module 15, the processing module 14 merely has to compare the cabin air condition parameters contained in that command signal with the various sets stored in the memory 17. When the module 14 finds a set of parameters that consists of parameters which are wholly identical to the air condition parameters set by the user, the adjustments associated therewith are then performed at once.

Figure 2:
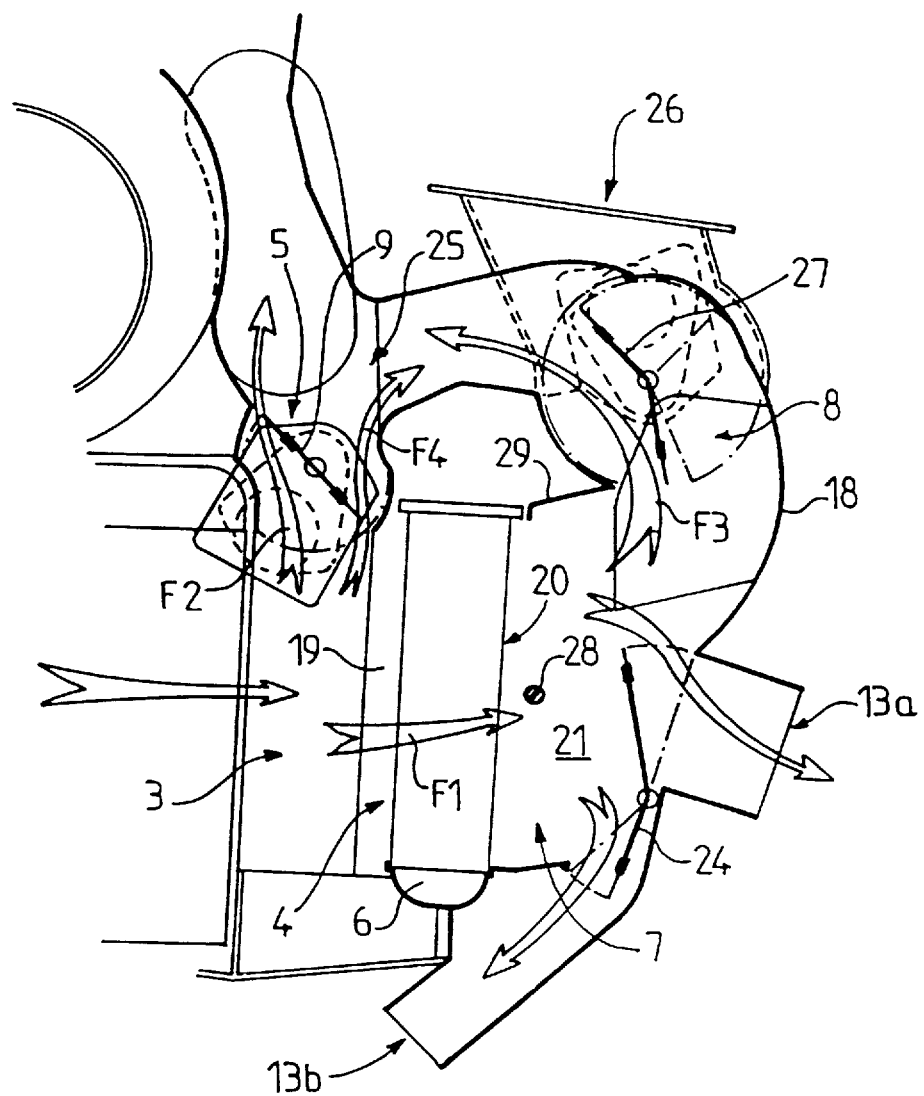
FIG. 2 is a simplified side elevation in transverse cross section of the air treatment unit in an installation in a preferred embodiment of the invention, generally of the kind shown in FIG. 1.

Reference is now made to FIG. 2, to describe in greater detail a preferred embodiment of the installation. In this embodiment, the fresh air delivery chamber 3, the first or heating duct 4 and the second or fresh air duct 5 are contained in a casing 18 which is shown in thick lines in FIG. 2.

The configuration of the air treatment unit shown in FIG. 2 and its casing 18 corresponds more particularly to an installation in which the radiator 6 is of the hot water type, that is to say the temperature of the heating radiator 6 is adjustable.

The air received from the motorized fan unit 2 (not shown in FIG. 2) flows into the delivery chamber 3 and then, according to the setting of the regulating valve 9, is distributed to a greater or lesser extent into each of the two ducts 4 and 5. In the example shown, the regulating valve 9 is slightly open, and therefore most of the air that flows through the delivery chamber 3 enters the first or heating duct 4 in the upstream part 19 of the latter, whence it passes through the heating radiator 6, to leave the radiator 6 via its outlet face 20 to reach the downstream part 21 of the duct 4. The remainder of the air flowing in the fresh air delivery chamber 3 passes into the second, or fresh air, duct 5. The paths of the two air streams flowing into the duct 4 and the duct 5 are indicated by the arrows F1 and F2 respectively in FIG. 2.

The fresh air duct 5 leads to at least one ventilating air vent 12 (not shown in FIG. 2, but see FIG. 1) which in this example is located in or close to the fascia of the vehicle. The downstream part 21 of the heating duct 4 leads partly to two foot warming air vents, namely a front vent 13a and a rear vent 13b, for directing treated air into the cabin H in the region of the feet of the occupants of the vehicle in the front and rear respectively of the cabin. Access to these vents 13a and 13b is controlled by an adjustable distribution valve 24 of the flap type. The downstream part 21 of the heating duct 4 also leads to the mixing zone 8. In this example, the zone 8 is in the form of a communication duct that communicates with part of the fresh air duct 5 through a branch 25 of the latter. The communication duct 8 has an outlet for passing treated air to a de-icing vent 26, access to which is controlled by a second distribution valve 27.

Depending on the setting of the first or adjustable distribution valve 24, either all, or only part, of the air which is heated by the radiator 6 passes into the mixing zone 8, as represented by the arrow F3 in FIG. 2. This heated air then passes into the fresh air duct 5, where it is mixed with untreated fresh air before being taken to the ventilating vents 12. When the regulating valve 9 is open, some of the air that passes into the fresh air duct 5 is directed into the mixing zone 8 via the branch 25 (as indicated by the arrow F4 in FIG. 2), in the opposite direction from the direction F3 in which the heated air flows. This fresh air is then mixed in the mixing zone 8 with the hot air, after which it is passed to the foot warming vents 13a and 13b when the distribution valve 24 is open.

A configuration such as that shown in FIG. 2 produces a temperature difference ΔT between the air which is distributed to the foot warming vents 13a and 13b and the air distributed to the ventilating vents 12. In this connection, the air which goes to the foot warming vents 13a and 13b consists mainly of hot air, and only a small part of it consists of untreated fresh air. By contrast, the air taken to the ventilating vents 12 consists mainly of untreated fresh air and only a small proportion consists of hot air.

This temperature difference ΔT gives improved comfort to the occupants of the cabin. In order to avoid any significant variation in the temperature difference ΔT when the required cabin temperature TS is set by the user on the control module 15, FIG. 1, a temperature sensor 28 is located in the downstream part 21 of the heating duct 4, a few centimetres downstream of the outlet face 20 of the heater 6. The temperature sensor 28 is preferably fixed to the wall 29 of the downstream part 21 of the duct 4, being substantially centred with respect to the heater outlet face 20. In this way, the measurement of the temperature TM which is obtained represents to the greatest possible extent the actual temperature of the heated air in the duct 4.

The temperature sensor 28 is connected to the processing module 14, to which it delivers a continuous measurement of the temperature TM of the heated air when the installation is working. The processing module 14 includes a timing device 30 which enables it to sample the temperature measurement TM at regular time intervals, which may be as short or as long as desired. These intervals will normally be determined by the manufacturer.

After each sampling of the measured temperature TM, the processing module forms a set of parameters which comprises the measured temperature TM, the temperature TS set by the user, and, preferably, at least one value of airflow rate DS set by the user and corresponding to the desired flow rate at, for example, the ventilating vents 12 and foot warming vents 13. This set of parameters is then compared with all of the sets of parameters measured in the memory 17. These latter will of necessity include one set of parameters which is identical to that which comprises the set values TS and DS of these parameters and the measured values TM. One set of parameters defining the appropriate adjustments will correspond to this memorized set of parameters. These adjustments relate, in particular, to the running mode of the fan in the motorized fan unit 2, the position (or current setting) of the regulating valve 9, and the current setting of the distribution valve 24. The adjustments may also relate to the temperature of the hot liquid flowing in the heating radiator 6, because in the example shown, the radiator 6 is of the variable temperature kind: this enables adjustment of the temperature difference described above to be finely controlled. It is then only necessary for the processing module 14 to implement the adjustments represented by the selected set of adjustment parameters.

The table (or "multiplicity") of sets of adjustments which are associated with the sets of cabin air condition parameters memorized in the memory 17 are so chosen that the temperature difference ΔT between the streams of air distributed to the ventilating vents 12 and foot warming vents 13 follows a predetermined law or algorithm. This predetermined law, which controls the temperature difference ΔT, is preferably a constant regardless of what value of temperature TS is set by the user. Thus, even in the event of a major change in the temperature set by the user, the value of ΔT remains constant. This has a marked beneficial effect on the comfort of the occupants of the vehicle.

Figure 3:
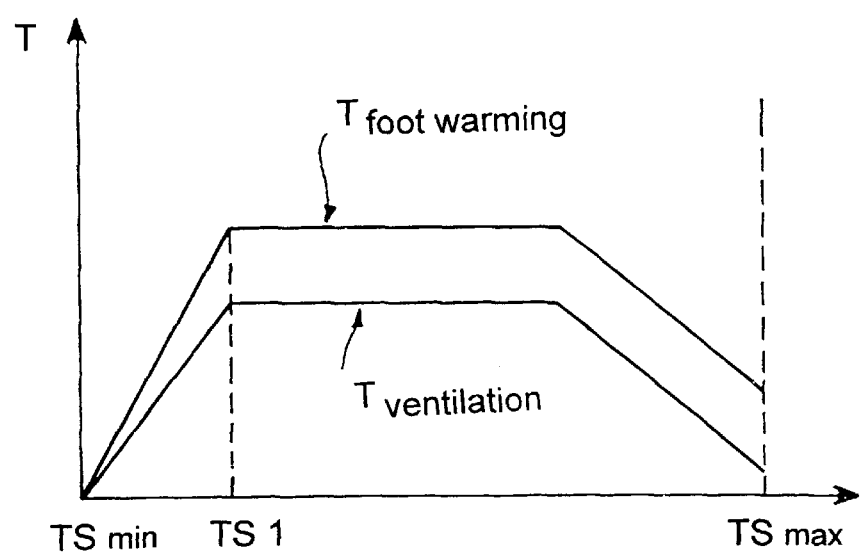
FIG. 3 is a diagram showing one example of a predetermined law or algorithm, in terms of the difference in temperature between the ventilating outlet vents and the foot warming outlet vents.

Reference is now made to FIG. 3, in which the upper curve indicates the temperature of the air at the foot warming vents 13, while the lower curve indicates the temperature of the air in the region of the ventilating vents 12, all as a function of the temperature TS set by the user. In FIG. 3, the temperature difference ΔT is equal to the spacing between the two curves for a given value of TS.

The above mentioned predetermined law may of course be different from a constant. It may for example increase initially, and so long as the temperature TS set by the user remains below a first threshold value TS1, becoming constant only once this threshold value is reached.

On the next occasion when the temperature of the heated air is sampled by the processing module 14, the latter carries out the same search among the sets of adjustment parameters, and adapts, if necessary, at least some of the actual adjustments made in the installation itself.

This mode of operation is of particular importance in view of the fact that the air which is delivered by the motorised fan unit 2 into the fresh air delivery chamber 3, and therefore into the first or heating duct 4, is derived from outside the vehicle or from inside the cabin H. The temperature of this air can vary very sharply according to where the vehicle happens to be at the time, or in the event of a door of the vehicle being opened. Under these conditions, the air which is heated while passing through the radiator 6 can display, at the output of the latter, significant temperature variations which it is imperative to control by adjustment of the regulating valve, and, if necessary, also the running mode of the fan.

The invention is of course not limited to the embodiment described above by way of example, and does extend to other versions. Thus for example, the radiator contained in the first or heating duct could be a radiator of the constant temperature type: consequently, the arrangement of the air treatment unit may be substantially different from that which is described above with reference to FIG. 2.

In addition, the number of parameters contained in the various sets of parameters may be substantially different from what is described above.

What is claimed is:

1. A fresh air heating and ventilating installation for a motor vehicle having a cabin, the installation comprising: a fresh air delivery chamber for receiving fresh air; a first duct having an outlet and an inlet communicating with said delivery chamber for receiving at least some of the fresh air from said delivery chamber; a second duct having an outlet and an inlet communicating with said delivery chamber for receiving at least some of the fresh air from said delivery chamber; a heating radiator in said first duct; a regulating valve mounted at said first and second duct inlets for controlling the distribution of the fresh air from said delivery chamber between said first and second ducts, means for defining an air mixing zone in communication with said first and second duct outlets, whereby said first and second ducts exhaust air from said ducts at least partially into said mixing zone; ventilating air vent means for supplying ventilating air in the cabin; foot warming air vent means for supplying foot warming air in the cabin; duct means for connecting said mixing zone with said ventilating air vent means; further duct means for connecting said mixing zone with said foot warming air vent means, whereby air from said fresh air delivery chamber is delivered into the cabin through said ventilating air vent means and said foot warming air vent means; control means in the cabin for generating command signals and a predetermined setting of cabin air conditions parameters; and processing means coupled to said control means for receiving said command signals from said control means, said processing means being coupled to the installation for governing operation of the installation in response to said cabin air conditions parameters settings, said processing means establishing a difference in temperature between said ventilating air from said ventilating air vent means and said foot warming air from said foot warming air vent means, wherein the installation further includes a temperature sensor downstream of said heating radiator for generating air temperature signals, said temperature sensor being coupled to said processing means for delivering to said processing means signals representing air temperature in said first duct, said processing means being further arranged to govern said regulating valve in response to a predetermined air temperature in the cabin, the temperature measured by the temperature sensor, and a predetermined law relating to said temperature difference.

2. An installation according to claim 1, wherein said processing means include a memory having a correspondence table that establishes a correspondence between a plurality of first sets of parameters comprising respectively different combinations of at least one temperature in the cabin and a temperature of air heated in said first duct, and a plurality of second sets of parameters, each said second set defining at least one adjustment of said regulating valve.

3. An installation according to claim 2, wherein said processing means further controls flow rates of air for delivery to said ventilating air vent means and said foot warming air vent means respectively, in response to predetermined parameters, said processing means maintaining said temperature difference substantially constant independently of said control means setting; the installation further including a controllable fan, said processing means controlling said flow of air by governing the fan in conjunction with at least said regulating valve.

4. An installation according to claim 3, wherein said first sets of parameters comprise combinations of said cabin air temperature, said temperature of heated air in said first duct, and said airflow rate, and said second sets of parameters controlling said fan and said regulating valve.

5. An installation according to claim 1, wherein said processing means sample periodically said air temperature measured by said temperature sensor to adjust said processing means in accordance with said measured temperature.

6. An installation according to claim 1, wherein said predetermined law is a constant that is independent of said predetermined cabin air conditions parameters.

7. An installation according to claim 1, wherein said first duct has a wall defining a downstream part of the duct, said radiator mounted in said duct upstream of said downstream part, said radiator having an outlet face, said temperature sensor on said wall and substantially centered with respect to said radiator outlet face.

8. An installation according to claim 1, wherein said radiator is a variable temperature radiator.

* * * * *